Jan. 24, 1967   N. O. ROSAEN   3,300,663
POWER TRANSFER CIRCUITS
Filed Dec. 30, 1963

INVENTOR.
NILS O. ROSAEN

United States Patent Office 3,300,663
Patented Jan. 24, 1967

3,300,663
POWER TRANSFER CIRCUITS
Nils O. Rosaen, Bloomfield Hills, Mich.
(1776 E. 9 Mile Road, Hazel Park, Mich. 48030)
Filed Dec. 30, 1963, Ser. No. 334,471
12 Claims. (Cl. 310—12)

The present invention relates to electric current generators, particularly to a permanent magnet commutatorless generator and more particularly to such a generator having means for readily varying the current output.

Conventional generating devices for converting mechanical energy into electrical energy have the disadvantage that they require moving elements such as commutators and the like which are apt to produce undesirable current fluctuations and are subject to wear and damage.

Copending applications bearing Ser. No. 108,547, filed by me on May 8, 1961 now Patent No. 3,163,785 and Serial No. 334,470, filed by me on Dec. 30, 1963, disclose and claim new simplified current generators comprising a fluid carrying magnetic particles past conductors. Means in the form of permanent magnets are provided to align the magnetic particles as they flow past the conductors to thereby induce an electrical current flow within the conductors.

While the power transfer circuits disclosed in my aforementioned copending applications have proven quite satisfactory, no means were disclosed in these applications for varying the current output of the circuits.

The present invention provides a power transfer circuit which is provided with means selectively operable to vary the current output of the circuit.

It is an object then of the present invention to provide a simplified variable output generator device by providing a fluid provided with magnetic particles, means conducting the fluid past a conductor to induce current flow and means selectively operable to vary the polar axes of said magnetic particles to vary the output of the conductor.

It is another object of the present invention to provide a permanent magnet commutatorless generator for producing a current flow of a desired value by moving a magnetic substance through a magnetic field to moleculary align the magnetic substance, arranging a conductor for the induction of current, and providing a selectively and variably operable means for changing the position of the polar axes of the particles making up the magnetic substance to vary the magnitude of the current induced in the conductor.

Figure 1:
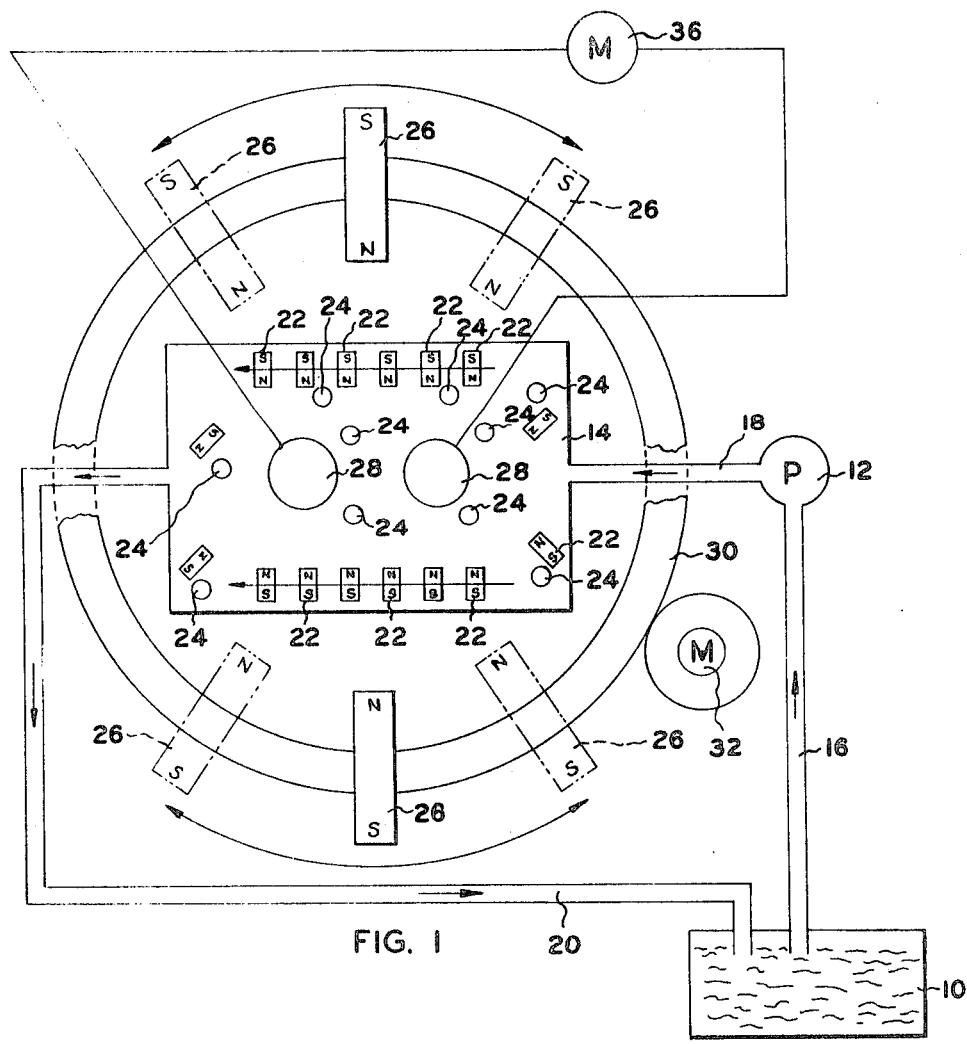

Still further objects and advantages of the present invention will readily occur to one skilled in the art to which the invention pertains upon reference to the following drawings in which like characters refer to like parts throughout the several views and in which FIG. 1 illustrates diagrammatically a preferred generating system of the present invention.

Figure 2:
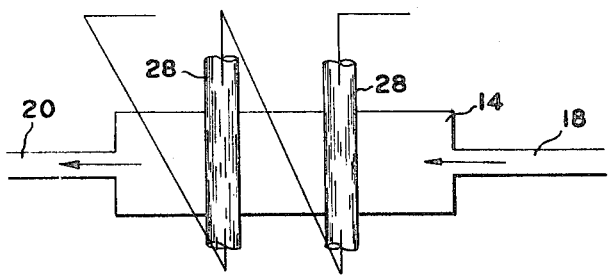

FIG. 2 is a fragmentary diagrammatic cross sectional view of the generating chamber illustrated in FIG. 1.

Description

As illustrated diagrammatically in the drawings, the system of the present invention preferably comprises a fluid reservoir 10, a pump 12, a generating chamber 14, and fluid conducting conduits 16, 18 and 20 to provide fluid flow through the generating chamber 14 in the direction indicated by the arrows.

The fluid itself comprises a heterogeneous mixture of magnetic particles 22 and diamagnetic particles 24, indicated diagrammatically respectively as elongated bodies and round bodies inside the chamber 14. The particles 22 and 24 are carried in a fluid medium to give the desired mobility.

The term "magnetic particles" is intended for purposes of this disclosure to mean particles of a substance which has the characteristic that they become polarized in the presence of a magnetic field and are attracted to the source of the magnetic field. By the term "diamagnetic particles" it is meant particles of a substance which has the characteristic of being repelled by the source of the magnetic field.

The magnetic particles 22 may be of that group of metals including iron or such iron alloys as $Fe_2CO$, preferably very finely powdered and having a density of about 6 to 8 at 20° C. The diamagnetic particles 24 may be of that group of metals including bismuth, also finely powdered and preferably having a greater density than the magnetic particles 22. Bismuth's density, for example is about 9.8 at 20° C.

The fluid medium or carrier may be diethylene glycol, ethylene glycol or a mixture of the two with a suitable corrosion inhibitor and distilled water if needed so that the fluid medium has the characteristics that it is not affected by extremes of temperature, protects against rust and corrosion and will not effect the stability of the two carried elements. Yet such a carrier will provide the composite with fluidity enabling it to be poured, so that it will flow readily and be capable of being pumped through the fluid circuit.

Permanent magnets 26 are disposed adjacent opposite sides of the chamber 14 to provide magnetic fields within the chamber 14 through which the fluid passes. Conductors 28 shown diagrammatically as rods extend through the chamber 14 and are disposed normal to the direction of fluid flow therethrough. With the magnets 26 in the position shown in solid lines with the north poles of the magnets 26 directed toward each other, the magnetic particles 22 will become magnetized and each will become a magnet with the poles oriented as indicated diagrammatically in FIG. 1 so that as the fluid is conducted past the conductors 28 in the direction indicated, a positive electrical current is induced in the conductors 28.

The magnets 26 are preferably affixed to a ring 30 or similar structure so that the magnets 26 are movable arcuately intermediate the dotted line positions indicated in FIG. 1. In each position, the polar axes of the magnets 26 are aligned and extend radially with respect to the ring 30. A motor 32 may be provided to move the ring 30 and the magnets 26.

As illustrated in FIG. 2, the conductors 28 are connected in series and with like windings projecting through the chamber 14. Any electricity using device such as a motor 36 is connected with the conductors 28.

With the system in the solid line position illustrated in FIG. 1, the magnetic particles 22 will become magnetized and will be oriented as illustrated diagrammatically with the poles of the magnets 26 adjacent the chamber 14 attracting opposite poles of the magnetic particles 22. The tendency of the particles 22 to be attracted to the sides of the chamber 14, by the magnets 26 will be effectively counteracted by the tendency of the denser diamagnetic particles 24 to move away from magnets 26.

As the fluid is pumped through the chamber 14, the lines of force produced by the magnetized particles 22 will be cut by the conductors 28 to induce a current flow through the conductors 28. The magnitude of this current will depend upon the strength of the magnetic fields produced by the magnetic particles and the number of lines of force cut by the conductors 28 in a given time. Thus it is apparent that by varying either the rate at which the fluid is pumped through the chamber 14 or the direction of the lines of force of the magnetized particles 22 the current induced in the conductors 28 can be varied.

At a given flow rate of the fluid, a maximum current output will be produced by the device of the present invention when the magnets 26 are in the position shown in solid lines in FIG. 1. With the magnets 26 in this position, the magnetized particles 22 will be oriented with their individual polar axes disposed substantially normal to the direction of fluid flow and therefore will present a maximum number of lines of force to the conductors 28 as the fluid is pumped through the chamber 14.

To vary the current output, the magnets 26 are moved toward either of the dotted line positions. Such movement varies the angles that the polar axes of the magnetized particles 22 will form with respect to the direction of fluid flow and therefore will decrease the number of lines of force which will be presented to and cut by the conductors 28 as the fluid flows through the chamber 14.

Thus it is apparent that a means for readily varying the current output of the generator device of the present invention have been provided. It is also apparent that although I have described but one embodiment of the present invention and illustrated this embodiment only diagrammatically, many structures and changes for carrying out the invention could be made by one skilled in the art without departing from the spirit of the invention and the scope of the appended claims.

I claim:
1. An induction circuit comprising
   (a) a source operable to produce a magnetic field,
   (b) a fluid and means moving said fluid through said magnetic field,
   (c) said fluid including first particles carried therein and having the property of being polarized in said magnetic field and being attracted to said magnetic field producing source,
   (d) second particles carried in said fluid having the property of being repelled from said magnetic field producing source,
   (e) said magnetic field producing source being arranged and operable to effect molecular alignment in said first particles whereby said fluid becomes in effect a magnetic field in motion,
   (f) a conductor extending through said fluid whereby movement of said fluid induces electric current flow in said conductor, and
   (g) means selectively operable to vary the direction of the lines of magnetic force produced by said magnetic field producing means.

2. The circuit as defined in claim 1 and in which said conductor extends normal to the direction of movement of said fluid.

3. A current generating device comprising
   (a) a housing having a fluid chamber,
   (b) fluid in said chamber,
   (c) means effecting unidirectional motion of said fluid in said chamber,
   (d) said fluid having magnetic particles therein,
   (e) means effecting molecular magnetic alignment of said particles to produce a magnetic field about each of said particles,
   (f) a conductor disposed in said chamber and extending normal to the direction of movement of said fluid whereby electric current flow is induced in said conductor, and
   (g) said particle alignment effecting means including means selectively operable to vary the direction of the lines of force produced by said particles.

4. The current generating device as defined in claim 3 and in which said particle alignment effecting means further comprises permanent magnets disposed on opposite sides of said chamber and arranged with like poles directed toward each other and said last mentioned means comprises means for changing the position of the polar axis of said magnets with respect to the direction of movement of said fluid through said chamber.

5. The device as defined in claim 4 and in which said fluid has diamagnetic particles therein of greater density than said magnetic particles to impede a tendency to lateral movement by attraction of said magnets for said first mentioned particles.

6. The current generating device as defined in claim 3 and in which said particle alignment effecting means further comprises a permanent magnet disposed closely adjacent said chamber and said last mentioned means comprises means for changing the position of the polar axis of said magnet with respect to the direction of movement of said fluid through said chamber.

7. A current generator device comprising
   (a) a housing having a fluid chamber,
   (b) a fluid in said chamber,
   (c) means effecting movement of said fluid through said chamber,
   (d) said fluid having magnetic particles therein,
   (e) means effecting molecular magnetic alignment of said particles,
   (f) a conductor disposed in said chamber and extending substantially normal to the direction of movement of said fluid whereby electric current flow is induced in said conductor,
   (g) said effecting means including means selectively operable to vary the direction of the lines of force produced by said particles whereby the magnitude of the current induced in said conductor can be varied.

8. An induction circuit comprising
   (a) a source operable to produce a magnetic field,
   (b) a fluid and means moving said fluid through said magnetic field,
   (c) said fluid including particles carried therein and having the property of being polarized in said magnetic field and being attracted to said magnetic field producing source,
   (d) said magnetic field producing source being arranged and operable to effect molecular alignment in said particles whereby said fluid becomes in effect a magnetic field in motion,
   (e) a conductor extending through said fluid whereby movement of said fluid induces electric current flow in said conductor, and
   (f) means selectively operable to vary the direction of the lines of magnetic force produced by said magnetic field producing means.

9. The circuit as defined in claim 8 and in which said conductor extends normal to the direction of movement of said fluid.

10. The current generating device as defined in claim 3 and in which said particle alignment effecting means further comprises permanent magnets disposed on opposite sides of said chamber and with like poles directed toward each other and said last mentioned means comprises means for pivoting said magnets about an axis substantially parallel to said conductors.

11. The device as defined in claim 3 and in which said particle alignment effecting means further comprises a permanent magnet disposed with one of its poles closely adjacent said chamber and its polar axis substantially normal to said conductor and said last mentioned means comprises means pivoting said magnet about an axis disposed exteriorly of said magnet.

12. An induction circuit comprising
   (a) a source operable to produce a magnetic field,
   (b) a fluid and means moving said fluid through said magnetic field,
   (c) said fluid including particles carried therein and having the property of being polarized in said magnetic field and being attracted to said magnetic field producing source, (d) said magnetic field producing source being arranged and operable to effect molecular alignment in said particles whereby said fluid becomes in effect a magnetic field in motion, (e) a conductor extending through said fluid substantially normal to the flow thereof whereby movement of said fluid induces electric current flow in said conductor, and (f) means selectively operable to pivot said magnetic field producing source about an axis substantially parallel to said conductor.

References Cited by the Applicant

UNITED STATES PATENTS 2,787,354 4/1957 Gill.
2,988,000 6/1961 Blake.

FOREIGN PATENTS 17,936 1908 Great Britain.

MILTON O. HIRSHFIELD, *Primary Examiner.*

D. X. SLINEY, *Assistant Examiner.*